(12) United States Patent
Hughes et al.

(10) Patent No.: US 9,127,234 B2
(45) Date of Patent: Sep. 8, 2015

(54) COKE COMPOSITIONS FOR ON-LINE GAS TURBINE CLEANING

(71) Applicant: ENVIROCHEM SOLUTIONS LLC, New Waverly, TX (US)

(72) Inventors: Mark D. Hughes, Houston, TX (US); Daniel T. Smith, Montgomery, TX (US); Kenneth W. Koch, Sr., Manchester, MO (US)

(73) Assignee: ENVIROCHEM SOLUTIONS LLC

( * ) Notice: Subject to any disclaimer, the term of this patent is extended or adjusted under 35 U.S.C. 154(b) by 184 days.

(21) Appl. No.: 14/017,617

(22) Filed: Sep. 4, 2013

(65) Prior Publication Data

US 2014/0066349 A1   Mar. 6, 2014

Related U.S. Application Data

(62) Division of application No. 13/529,271, filed on Jun. 21, 2012, now Pat. No. 8,535,449.

(51) Int. Cl.
*C11D 7/02* (2006.01)
*F01D 25/00* (2006.01)
*C11D 11/00* (2006.01)
*C11D 3/12* (2006.01)

(52) U.S. Cl.
CPC ............... *C11D 7/02* (2013.01); *F01D 25/002* (2013.01); *C11D 3/12* (2013.01); *C11D 11/0041* (2013.01); *F05D 2300/224* (2013.01); *Y02T 50/671* (2013.01)

(58) Field of Classification Search
CPC .............................. C11D 11/0041; C11D 3/12
See application file for complete search history.

(56) References Cited

U.S. PATENT DOCUMENTS

| 4,032,305 | A  | * | 6/1977  | Squires ........................... 48/73   |
| 6,168,709 | B1 | * | 1/2001  | Etter ............................. 208/131 |
| 7,185,663 | B2 | * | 3/2007  | Koch et al. ................. 134/22.19     |
| 2002/0179493 | A1 | * | 12/2002 | Etter ............................. 208/131 |
| 2004/0016445 | A1 | * | 1/2004  | Koch et al. ....................... 134/7   |
| 2006/0032788 | A1 | * | 2/2006  | Etter ............................. 208/131 |

\* cited by examiner

*Primary Examiner* — Gregory Webb
(74) *Attorney, Agent, or Firm* — Robert W Strozier

(57) ABSTRACT

A particulate coke composition including expandable coke is capable of removing deposits from rotating parts of a gas turbine engine while under full fire or idle speed. The coke composition may be introduced directly into the combustion chamber (combustor) of the gas turbine or, alternatively, anywhere in the fuel stream, water washing system, or the combustion air system. By kinetic impact with the deposits on blades and vanes, the deposits will be dislodged and will thereby restore the gas turbine to rated power output. If introduced into the compressor section, the coke particles impinge on those metal surfaces, cleaning them prior to entering the hot gas section where the process is repeated.

8 Claims, No Drawings

COKE COMPOSITIONS FOR ON-LINE GAS TURBINE CLEANING

RELATED APPLICATIONS

This application is a divisional application of U.S. patent application Ser. No. 13/529,271 filed Jun. 21, 2012 (21 Jun. 2012) now U.S. Pat. No. 8,525,449 issued Sep. 17, 2013 (17 Sep. 2013), which claims priority to and the benefit of U.S. Provisional Patent Application Ser. No. 61/500,049 filed 22 Jun. 2011 (Jun. 22, 2011).

BACKGROUND OF THE INVENTION

1. Field of the Invention

Embodiments of this invention relate generally to gas turbine cleaning methods.

More particularly, embodiment of this invention relate to methods for on-line cleaning of the internal surfaces of selected sections of a hydrocarbon fuel burning gas turbine, which may include compressor sections, hot gas paths, and when present, attendant heat recovery equipment, where the cleaning methods utilize expandable and/or non-expandable coke particles to effect surface cleaning during operation.

2. Description of the Related Art

Gas turbines burning heavy fuels in particular are subject to a rapid buildup of ash deposits on the hot gas path that requires them to be shut down on a regular basis for thorough cleaning by water washing. In these instances some ash is also deposited on downstream boiler tubes used for heat recovery when the gas turbine is operated in a co-generation mode or in combined cycle operation. This effect is still present, albeit to a lesser degree, when light distillates, natural gas, or other hydrocarbon based fuels are utilized. These deposits may result in lost power generation for the operator, amounting to potentially hundreds of thousands of dollars per month. Furthermore, deposits formed on the boiler tubes interfere with normal heat transfer; thereby reducing the quantity of steam produced which is a further drain on operating revenues.

Gas turbine technology has improved to the extent that many gas turbines can now attain nearly 60% thermal efficiencies. The efficiencies are obtainable for nearly all fuels. Many users consider heavy, dirty fuels, but regard the increased maintenance and lost power to be more troublesome than it is worth in fuel cost savings. However, the use of less than clean fuels remains only a minor percentage of fuels for this more important application. Instead, many gas turbines consume large quantities of natural gas and distillate fuels. These clean fuels may be diverted to other more important applications, if their need was reduced in gas turbine combustion.

Essentially all gas turbines, regardless of the fuel used, suffer power losses due to ingested contaminants in the large volumes of air required to support combustion. With time, these contaminants (e.g., dirt, salt spray, fuel residues, etc.) coat the extremely large surface area of the compressor section. As the deposits accumulate, compressor efficiency is affected and, in addition, the rotational speed of the turbine may be affected. It becomes necessary to introduce cleaning water and surfactants to wash off the deposits. Many times this cleaning procedure needs to await the shutdown of the gas turbine to do a thorough cleaning. In the meantime, power output and revenue are lost from the gas turbine operation.

A major problem in gas turbine operation on heavy fuels is the presence of sodium and vanadium in the heavy fuel. Both are extremely corrosive at the temperatures attained by modern gas turbines. To limit the effects of sodium, there have been strict limits on the amount of sodium in fuels. To meet the gas turbine manufacturer's requirements, fuel washing is employed. To counteract the corrosive nature of vanadium, magnesium additives must be used. Experience has shown that vanadium corrosion is inhibited when the magnesium is added at more than three times the theoretical requirement.

Ash created from the combustion of heavy fuels deposits on the gas turbine hot gas path parts. These deposits hinder the gas flow path streamline flow resulting in reduced power output, decreased efficiency (or increased heat rate), and increased compressor pressure ratio. Periodic cleaning (removal of these ash deposits) is necessary to restore lost power and efficiency, and to enable the compressor to operate within its normal limits. The rate of ash deposition is highly variable, but depends mainly on the turbine duty cycle, firing temperature (and consequently the hot gas path temperatures), and the level of fuel contaminants.

The duty cycle significantly affects the ash deposition rate. Gas turbines in peaking service that are shutdown daily may experience very slow rates of ash deposition. Some of the deposits absorb water (from the atmospheric humidity) during shutdown and spall off during restart due to thermal stresses in the deposits. This effect is reduced as the firing temperature is increased.

The hot gas path temperatures have a significant effect both on the rate of ash deposition and the type of deposit formed. Lower firing turbines will form mainly magnesium sulfate that is a soft material and will readily spall off during subsequent restarts. As firing temperatures increase above the 1700° F. to 1800° F. range, along with the hot gas path temperatures, the predominantly magnesium sulfate deposits are replaced by hard deposits composed mainly of magnesium oxide. These deposits are much harder to remove.

The fuel vanadium concentration and the attendant high level of magnesium inhibitor concentration have a significant influence on the ash deposition rate. As more ash goes through the unit per constant internal surface area, the chances become greater that this ash will build up on the hot gas path parts.

Several methods have been used over the years to clean gas turbines; the two primary methods being on-line cleaning and off-line cleaning. In on-line cleaning, nutshells (walnut, pecan, and/or rice hulls), graphite, and other substances have been introduced into the combustion chamber. Those particles that don't combust collide with the ash deposits causing them to spall off the blades. Unfortunately, many of the nutshells end up as extremely fine carbon ash that lacks the energy to clean the deposits. Also unburned nutshells can end up in bearings and other areas of the gas turbine where they are an unwanted nuisance. As a consequence of the difficulties of controlling the nutshells, this method of cleaning is used only when necessary. However, the main advantage of the nutshell technique is that it can be accomplished while the gas turbine is running (albeit usually at reduced load), generating electricity.

The other main cleaning method is off-line water washing. For this method the turbine must be taken out of service, cooled, and then water is injected through spray nozzles, while the engine is on crank speed, to thoroughly soak the deposits (some deposits may dissolve). There are many drawbacks to this method, the foremost being that the turbine is out of service during the entire cleaning operation. Water washing is used extensively to return gas turbines to full power. Additionally, the cleaning is often not adequate to completely remove all deposits. When the gas turbine is placed back into service with deposits still remaining, these deposits can become very hard from being subjected to additional periods of high temperature. When the deposits are hard enough, it may become necessary to dismantle the gas turbine to laboriously hand clean the deposits from surfaces.

There are a number of patents that disclose gas turbine cleaning methods, for cleaning both compressors and the hot gas path. Those for compressor cleaning are much more numerous than those that include the hot gas path. There are also several patents that disclose various chemical compositions used to clean deposits from gas turbine compressors, and others that disclose methods and/or apparatus with or without the use of chemicals.

Bartos, et al, U.S. Pat. No. 4,059,123 discloses a chemical cleaning method with a preservative. Likewise, Woodsen, et al, U.S. Pat. No. 4,808,235, and Sato, et al, U.S. Pat. No. 5,279,760 discloses different chemical cleaning solutions. Kaes, U.S. Pat. No. 5,002,078 discloses a chemical cleaning method for compressors that can be implemented off-line or on-line. Similarly, Amiran, U.S. Pat. No. 6,310,022 discloses a chemical cleaning composition to be used (off-line) for compressor cleaning while the compressor is being cranked.

Hodgens II, et al, U.S. Pat. Nos. 4,713,120 and 4,834,912 disclose a spray injection method and chemical compositions, respectively, for rinsing "baked-on" sand deposits from the compressor and turbine of aircraft type engines.

Hornak, et al, U.S. Pat. No. 4,196,020 discloses a wash spray nozzle apparatus for cleaning the compressor and turbine of a unit using a cleaning and rinsing method which also includes a preservative. Similarly, Butler, U.S. Pat. No. 6,394, 108 discloses a specially fabricated flexible hose with nozzles on it which is inserted into the first several stages of an offline gas turbine compressor for compressor cleaning. McDermott, U.S. Pat. Nos. 5,011,540 and 5,273,395 disclose an apparatus and method utilizing a chemical solvent for cleaning compressors.

Hayward, et al, U.S. Pat. No. 6,073,637 discloses a water spray method for cleaning gas turbine compressors in which droplets of a cleaning fluid are sprayed into the compressor, comprising the steps of: spraying droplets of a substantially first uniform size into or onto the fluid path for a first period, and then spraying droplets of a substantially second uniform size into or onto the fluid path for a second period.

Three patents disclose methods of cleaning the hot gas path of a gas turbine. Langford, U.S. Pat. No. 4,065,322 discloses the use of coke particles to remove contaminants from the compressor and turbine sections, wherein the addition of coke particles is through the air stream. However, the main thrust of this method is to clean the compressor section, while the gas turbine is in operation with the hot gas path as a secondary aspect of the invention. Also Langford places no realistic size limit on these coke particles specifying an upper size of 3.35 mm, clearly too large to be safely used without causing damage to the gas turbine metallurgy. Gas turbine operating temperatures at the time Langford disclosed his coke were from 300 to perhaps higher cooler than modern gas turbines. The temperature required to "activate" the expandable coke of the present disclosure would not have been attainable at that time whereas they are presently. British Patent GB839762 (Ross) discloses a method for limiting the deposition of fuel oil ash on the blading and other parts of a gas turbine, wherein particles of carbonaceous material (graphite) are added to the fuel oil prior to combustion in a ratio of from ½% to 3% by weight. The carbonaceous materials can be used with or without a magnesium compound corrosion inhibitor, but the patent is silent as to the amount of magnesium. Koch, et al, U.S. Pat. No. 7,185,663 discloses the use of expandable graphite and/or molybdenum based particles and oil soluble corrosion inhibitors introduced directly into the combustion chamber of the gas turbine, into the fuel stream, water wash system, or the combustion air system (hot gas path). The linking of the use of the cleaning particles with a magnesium based corrosion inhibitor appears to be central to the disclosure.

SUMMARY OF THE INVENTION

The present invention is distinguished over the prior art in general, and these patents in particular by methods for on-line cleaning of the internal surfaces of selected sections of a hydrocarbon fuel burning gas turbine including compressor sections, hot gas paths, and attendant heat recovery equipment that may be present when the gas turbine is operated in a co-generation mode or in combined cycle operation, which utilizes cleaning particles of expandable and/or non-expandable synthetic coke compositions. The cleaning methods dislodge unwanted ash deposit buildup and, thereby restore the gas turbine to rated power. When introduced into the compressor section, the particles of the particulate expandable and/or non-expandable coke compositions impinge on the metal surfaces, cleaning them prior to entering the hot gas section. The introduction of the compositions may be repeated as needed. In certain embodiments, the introduction may be intermittent, semi-periodic, periodic, semi-continuous, or continuously. If sufficient velocity is present in the combustion equipment, then a portion of the particulate compositions may be carried through the combustion exhaust, wherein the remaining particles also impinge on boiler tubes, providing an additional cleaning step. The cleaning methods are effective in cleaning any hydrocarbon fuel burning gas turbine systems including turbine systems burning heavy fuels, light distillate fuels, natural gas, and gas turbines that have multi-fuel capability. In certain embodiments, the particulate compositions include expandable cokes. These expandable synthetic cokes were found to be superior to expandable graphite or low purity non-expandable cokes. Expandable coke does not suffer the oxidation potential of expandable graphite when used in the hot gas path. Thus expandable coke will maintain its mass as it moves through the hot gas path performing its cleaning function. In those embodiments including expandable cokes, the expansion allows for treatment using smaller amounts of the quantities of particulate compositions to achieve a desired degree of cleaning. In other embodiments, the particulate compositions high purity, non-expandable cokes, where high purity means that the high purity, non-expandable cokes are at least 99 wt. % carbon. In certain embodiments, the high purity, non-expandable cokes are at least 99.5 wt. % carbon.

Embodiments of this invention provide methods method for on-line cleaning of internal surfaces of selected sections of a hydrocarbon fuel burning gas turbine system including both a compressor section and a hot gas path, which may be carried out during operation of the gas turbine system, where the methods include operating the system in the presence of a particulate cleaning composition.

Embodiments of this invention also provide methods for on-line cleaning of the internal surfaces of any downstream heat recovery equipment that may be present when the gas turbine is operated in a co-generation mode or in combined cycle operation, which may be carried out during operation of the gas turbine, where the methods include operating the system in the presence of a particulate cleaning composition.

Embodiments of this invention also provide methods for cleaning the internal surfaces of selected sections of a gas turbine, and attendant downstream heat recovery equipment if present, that will effectively clean any hydrocarbon fuel burning gas turbine operating on heavy fuels, light distillate fuels, natural gas, and gas turbines that have multi-fuel capability, where the methods include operating the system in the presence of a particulate cleaning composition.

Embodiments of this invention also provide particulate turbine cleaning compositions including expandable and/or non-expandable cokes, where the coke particles have particle sizes ranging from about 0.01 microns to about 1,000 microns. The compositions may be used on an intermittent, semi-periodic, semi-continuous, or continuous basis to clean surfaces of gas turbine system, and attendant downstream heat recovery equipment if present of ash that tends to cling to the surfaces during operation.

Embodiments of this invention also provide methods for online cleaning of a hydrocarbon fuel burning gas turbine systems, and attendant downstream heat recovery equipment if present, utilizing cleaning compositions that may be introduced directly into a combustion chamber (combustor) of the gas turbine system, into the fuel stream, into the water washing subsystem, or the combustion air subsystem (hot gas path).

Embodiments of this invention also provide gas turbine systems and heat recovery equipment cleaning composition utilizing expandable and/or non-expandable coke ranging in size from about 0.01 microns to about 50,000 microns, which when introduced into a compressor section of the gas turbine systems, will impinge on metal surfaces, cleaning them prior to entering a hot gas section and attendant downstream heat recovery equipment, if present.

Embodiments of this invention also provide gas turbine and heat recovery equipment cleaning processes utilizing a particulate composition including expandable coke, non-expandable coke or a mixture of expandable and non-expandable coke. For compositions including expandable coke, the expandable coke particles, when introduced into a gas turbine system will pass through filters and other equipment while in their unexpanded state, and will expand in volume instantaneously or substantially instantaneously upon heating to an expanded volume to at least 150 times its initial volume, to effectively clean a hot gas path of the gas turbine system and attendant downstream heat recovery equipment, if present. In certain embodiments, the expanded volume is at least 175 times greater then its initial volume. In other embodiments, the expanded volume is at least 200 times greater than its initial volume.

Embodiments of this invention also provide gas turbine and heat recovery equipment cleaning compositions, which are safe and innocuous in the environment and which, if spilled, are easily cleaned by sweeping, followed by soap and water washing.

Embodiments of this invention also provide gas turbine and heat recovery equipment cleaning compositions that are believed to be inexpensive to produce.

Other aspects of the invention will become apparent from time to time throughout the specification and claims as hereinafter related. The above noted aspects and other aspects of the invention are accomplished by methods for on-line cleaning of the internal surfaces of selected sections of hydrocarbon fuel burning gas turbine systems including a compressor section, a hot gas path, and attendant heat recovery equipment that may be present when the gas turbine systems are operated in a co-generation mode or in combined cycle operation, where the methods include introducing particulate cleaning compositions including an expandable coke, anon-expandable coke or a mixture of expandable and non-expandable cokes. The particulate cleaning compositions may be introduced directly into a combustion chamber (combustor) of the gas turbine systems, into the fuel substream, water washing subsystem, or the combustion air subsystem (hot gas path). The cleaning processes dislodge unwanted ash deposit buildup and, thereby restore the gas turbine system to rated power. When introduced into the compressor section, the particles of the particulate compositions impinge on metal surfaces, cleaning them prior to entering a hot gas section, where the processes may be repeated as needed. If sufficient velocity is present in the system, a portion of the particles are then carried through an exhaust, where they impinge on boiler tubes, providing an additional cleaning step. The cleaning processes and cleaning compositions are effective in cleaning any hydrocarbon fuel burning gas turbine systems including systems for burning heavy fuels, light distillate fuels, natural gas, and gas turbine system having multi-fuel capability.

DETAILED DESCRIPTION OF THE INVENTION

The present invention broadly relates to methods for on-line cleaning of internal surfaces of selected sections of hydrocarbon fuel burning gas turbine system, where the systems include the compressor section, hot gas path, and also attendant downstream heat recovery equipment if present, where the methods includes operating the systems in the presence of a particulate cleaning composition including an expandable coke or a mixture of expandable cokes, anon-expandable coke or a mixture of non-expandable cokes, or mixtures of expandable cokes and non-expandable cokes. As described in detail hereinafter, the particulate cleaning compositions may be introduced directly into the combustion chamber (combustor) of the gas turbine system, into the fuel stream, into the water washing subsystem, or the combustion air subsystem (hot gas path). The cleaning processes dislodge unwanted ash deposit buildup and, thereby restore the gas turbine system rated power. When introduced into the compressor section, particles of the particulate compositions impinge on the metal surfaces, cleaning them prior to the fuel entering the hot gas section of the systems, where the processes may be repeated as needed. When the gas turbine systems are operated in a co-generation mode or in combined cycle operation, and if the systems have sufficient flow velocity, a portion of the particles are then carried through an exhaust, where they impinge on boiler tubes, providing an additional cleaning step in the methods. The cleaning methods are effective in cleaning any hydrocarbon fuel burning gas turbine system including systems operating on heavy fuels, light distillate fuels, natural gas, and any gas turbines that have multi-fuel capability, and attendant downstream heat recovery equipment if present.

Embodiments of this invention provide methods for on-line cleaning turbine surfaces comprising during operation, contacting internal surfaces of selected sections of a hydrocarbon fuel burning gas turbine system, without significant loss of turbine power, with a cleaning composition comprising an expandable coke or a mixture of expandable cokes, a non-expandable coke or a mixture of non-expandable cokes or mixtures of expandable cokes and non-expandable cokes, where the coke particles have sizes ranging between about 0.01 microns (µm and about 1,000 microns (µm) and where the expandable coke particles are capable of expanding up to about 150 times their initial volume when heated above a predetermined temperature. In certain embodiments, the selected sections are associated with a compressor. In certain embodiments, the selected sections are associated with a hot gas path. In certain embodiments, the selected sections are associated with heat recovery equipment. In certain embodiments, the system burns a fuel selected from the group consisting of heavy fuel oil, Light Arabian crude oil, light distillate fuel oil, natural gas fuel and mixtures or combinations thereof.

Embodiments of this invention provide methods for on-line cleaning turbine surfaces comprising introducing, into a hydrocarbon fuel burning gas turbine system, a cleaning composition comprising a high purity expandable coke or a mixture of high purity expandable cokes, a high purity non-expandable coke or a mixture of high purity non-expandable cokes or mixtures of high purity expandable cokes and high purity non-expandable cokes, where the coke particles have sizes ranging between about 0.01 microns (µm and about 1,000 microns (µm), where the high purity cokes are greater than 90% carbon, where the expandable coke particles are capable of expanding up to about 150 times their initial volume when heated above a predetermined temperature, and where the composition cleans selected sections of a hydrocarbon fuel burning gas turbine system without significant loss of in system power production. In certain embodiments, the introducing step is performed intermittently, semi-periodically, periodically, semi-continuously, or continuously. In certain embodiments, the selected sections are associated with a compressor. In certain embodiments, the selected sections are associated with a hot gas path. In certain embodiments, the selected sections are associated with heat recovery equipment. In certain embodiments, the system burns wherein the system burns a fuel selected from the group consisting of heavy fuel oil, Light Arabian crude oil, light distillate fuel oil, natural gas fuel and mixtures or combinations thereof.

Embodiments of this invention provide methods particulate cleaning composition for on-line cleaning of surfaces hydrocarbon fuel burning gas turbine system a comprising a high purity expandable coke or a mixture of high purity expandable cokes, a high purity non-expandable coke or a mixture of high purity non-expandable cokes, or mixtures of high purity expandable cokes and high purity non-expandable cokes, where the coke particles have sizes ranging between about 0.01 microns (µm) and about 1,000 microns (µm), the high purity cokes are greater than 99% carbon, the expandable coke particles are capable of expanding up to about 150 times their initial volume when heated above a predetermined temperature, and the composition is capable of cleaning selected sections of a hydrocarbon fuel burning gas turbine system without significant loss of in system power production. In certain embodiments, the high purity cokes are greater than 99.5% carbon. In certain embodiments, the high purity cokes are greater than 99.75% carbon. In certain embodiments, the high purity cokes are greater than 99.9% carbon. In certain embodiments, the selected sections are associated with a compressor. In certain embodiments, the selected sections are associated with a hot gas path. In certain embodiments, the selected sections are associated with heat recovery equipment. In certain embodiments, the system burns wherein the system burns a fuel selected from the group consisting of heavy fuel oil, Light Arabian crude oil, light distillate fuel oil, natural gas fuel and mixtures or combinations thereof.

The expandable and/or non-expandable coke-based particulate compositions utilized in the present invention include particles having sizes ranging from about 0.01 microns to about 1,200 microns, depending upon the particular application. The expandable and/or non-expandable coke-based particulate compositions may be selected from the group consisting of coke, coated coke, expandable coke, non-expandable coke, particles impregnated with expandable and/or non-expandable cokes, or mixtures thereof. In certain embodiments, the particles have a size between 100 microns and about 1180 microns. In other embodiments, the particles have a size between about 10 microns and 180 microns. In other embodiments, the particles have a size between about 10 microns and 150 microns.

One particular advantage of compositions including expandable coke is that such composition require less amount of the compositions to effective a give leave of cleaning. In embodiments using expandable cokes, the amount of the composition required may be from about one tenth up to about one two hundredth compared to compositions including standard coke to achieve a desired degree of cleaning. Not only will embodiments using expandable cokes result in less of the compositions being required for a given degree of cleaning, more importantly, less particles require trapping by back end environmental controls. Thus, such compositions not only better protect the environment, they also will provide a benefit to the user by reducing the overall costs of cleaning gas turbine systems over other methods (less material and less waste generated). The foot print of the ancillary equipment needed for cleaning would also be reduced by a reduced requirement for material helping reduce plant size, which is often at a premium since very often electrical generation sites are very near large cities—users of the electricity produced by the site.

Another feature of compositions including expandable cokes over composition including standard cokes is the effect on cleaning ability. Langford, in his disclosure, discloses how the coke in his invention shatters upon impact retaining its edges, etc., producing more cleaning particles. However, Langford does not discuss the great reduction in cleaning effectiveness due to the reduction coke particle size, i.e., reduction in particle mass. Another disadvantage of standard coke shattering is as small particles break apart they become smaller and thereby will enter a size domain that may have adverse health effects. In contrast, the compositions of this invention including expandable coke particles, which increase in size after passing through various combustors in the gas turbine system. Their weight will obviously remain the same, but the volume they occupy will increase. Not only will this make the particles easier for environmental controls to capture, but it will also reduce their impact on the society that often resides in the area of a power plant's exhaust plume especially in more densely populated countries.

As expandable coke is heated and expands, it becomes softer. This allows the particles to occupy a greater volume, which means these particles will impact a greater area of the surfaces of the gas turbine parts selected for cleaning, especially the hot gas path and heat recovery equipment that may be present. Upon expansion, the expandable cokes also become softer so that polishing effects described by Langford are not a concern—polishing normally indicates metal loss.

Particles of expanded coke will instead of hitting the metal and breaking off small pieces will instead "smash" onto the metal and slide along its surfaces actually filling in voids that may become locations for corrosion and/or deposits to begin to form. The much larger volume will also translate into a larger area of the metal surfaces being cleaned per particle.

As stated, one aspect of this invention is to reduce the cost of cleaning a gas turbine system. This is accomplished not only by allowing a gas turbine system to continue to operate during the cleaning operation, but also by reducing the amount of material that is required. Particulate cleaning compositions including expandable coke requires less material to achieve the same or better results than does traditional nutshell cleaning methods. This is achieved without the hazards and drawbacks of the nutshell process. Similarly, particulate compositions including expandable coke require much less material to be utilized which reduces initial cost and also the cost of material as less is required. The cost of equipment required is also reduced as its size is greatly reduced.

Another property of expandable coke is it is a lubricating form of carbon. This means, where the particles do strike metal surfaces, the particles will leave a thin film of carbon. The thin film of carbon will help reduce the formation of future deposits as the metal surfaces will be slick. The thin film of carbon will also help insulate the surfaces of the metal parts particularly in the hot gas path. Allowing a gas turbine to operate at just a few degrees hotter would increase the output of the gas turbine further reducing the operation costs of the utility and would also allow for the generation of more electricity with the same carbon foot print of fuel. Environmentally, this is very good.

Because of this lubricating property, should any of the expandable coke find its way into bearings or other rotating parts in the gas turbine, it will be a benefit instead of the negative exhibited by traditional nutshells cleaning compositions.

In some applications, the particulate compositions of this invention may be formulated with aromatic solvents, surfactants, paraffinic solvents, or mixtures thereof. In other applications, the particulate compositions of this invention may be dispersed into surfactant solutions, which may include, without limitation, fatty acids, sulfonic acids, organic carboxylic acids, polymeric materials, or mixtures thereof.

In still other applications, the particulate compositions of this invention may be treated with suitable agents to enhance the ability for expanded coke particles to expand or to allow easier application in of the composition for their intended role.

It may also be appropriate for the coke particles to be formulated to include a suitable oil soluble corrosion inhibitor to mitigate the deleterious effects of high temperature vanadium. Suitable materials for this application would be sold under the trademark LMG-30E® or LMG-305®, both produced by Liquid Minerals Groups, Inc., of Houston, Tex. Both of these magnesium-based corrosion inhibitors have a high concentration (30%) of useful magnesium. When the particulate cleaning compositions of this invention are used in combination with a magnesium-based oil soluble corrosion inhibitor additive for continuous cleaning and protection against vanadium corrosion of the gas turbine and downstream heat recovery equipment if present, the following formulations are suggested:

EXPERIMENTS OF THE INVENTION

Example 1

This example includes an expandable coke-based cleaning composition having the following formulation, where the expandable coke material has particles having sized between about 0.01 µm to 1,000 µm:

| Component | wt. % |
| --- | --- |
| Oil soluble corrosion inhibitor | 97 |
| Expandable Coke material | 3 |

Example 2

This example includes an expandable coke-based cleaning composition having the following formulation, where the expandable coke material has particles having sized between about 0.01 µm to 1,000 µm.

| Component | wt. % |
| --- | --- |
| Oil soluble corrosion inhibitor | 99 |
| Expandable Coke material | 1 |

Example 3

This example includes an expandable coke-based cleaning composition having the following formulation, where the expandable coke material has particles having sized between about 0.01 µm to 1,000 µm:

| Component | wt. % |
| --- | --- |
| Oil soluble corrosion inhibitor | 83 |
| Aromatic solvent | 13 |
| Surfactant | 3 |
| Expandable Coke material | 1 |

In Examples 1 to 3 above, the expandable coke material is selected from the group consisting of coke, coated coke, expandable coke, particles impregnated with coke, or mixtures thereof.

The oil soluble corrosion inhibitor utilized in Examples 1 to 3 above, include magnesium carboxylates or magnesium sulfonates and/or materials as carboxylates, sulfonates, or phenates formulated with metals selected from the group of elements containing cerium, zirconium, nickel, silicon, chromium, aluminum, barium, manganese, and/or iron. A very suitable magnesium carboxylate corrosion inhibitor is produced under the trademark LMG-30E®; a very suitable magnesium sulfonate corrosion inhibitor is produce under the trademark LMG-30S® for example.

Cleaning Methods

There are numerous types and configurations of gas turbines, depending on the manufacturer. Most gas turbine manufacturers would limit the allowable power loss to the range of 5 to 10% per 100 hours of operation. Losses higher than this may cause other operating problems such as compressor surge. To remove these deposits and regain a portion of this power loss, the following preferred on-line cleaning methods are employed.

The present cleaning compositions and methods allow a gas turbine operator to periodically clean hydrocarbon fuel burning gas turbine compressor and/or hot gas paths while still online. The expandable coke cleaning composition, selected from the following group consisting of coke, coated coke, expandable coke, particles impregnated with coke, or mixtures thereof is held in a hopper or similar device and fed to the desired turbine section to be cleaned. From time to time, as determined by field trials, a quantity of the expandable coke cleaning composition is fed to the gas turbine to effect the removal of deposits. The frequency and amount of expandable coke cleaning composition fed to the turbine is such that the power loss associated with deposit build-up is maintained at a manageable rate. Because this method can be done intermittently while the gas turbine is in operation, there is no lost time due to turbine cool-down periods (to prevent thermal shock). This allows more opportunity to generate electricity due to less down time.

The expandable coke particles alone or in combination with the oil soluble corrosion inhibitor, solvent, and/or surfactant may be added directly into the combustion chamber from the hopper or similar device, utilizing conventional water wash nozzles. Conventional water wash nozzles were developed during the 1970's to allow for the easy addition of water while the turbine was off-line to water wash the hot gas section of the gas turbine. These nozzles are designed to be used only when the turbine is off-line, thus, their use to introduce the cleaning composition would not interfere with their primary function since the two operations would be mutually exclusive expandable coke cleaning composition while the turbine is operating, water when it is shut down.

A second option is to "blow" the expandable coke cleaning composition into the inlet air after the air filter to clean not only the compressor, but the particles would then continue into the hot gas section of the gas turbine, continuing the cleaning operations there. The particles do not achieve their full size until they pass through the flame as the heat is required to expand the coke particles. Because this method can be used more or less continuously, concerns of introducing sodium from the compressor into the hot gas section are minimized, as the overall concentration of this high temperature corrosion contaminant should not be excessive on a real time basis.

In addition it is also possible to introduce the expandable coke cleaning composition into the compressor section of a gas turbine for the express purpose of cleaning the compressor. Compressor section cleaning—like hot gas section cleaning—is conventionally done while the gas turbine is off-line. However with the present method and expandable coke compositions, continuous or semi-continuous addition of the expandable coke cleaning composition will remove deposits in real time. If cleaning is done often enough, any deposits that are removed should be small enough in quantity to not jeopardize the integrity of the hot gas section of the gas turbine. Thus the present method is ideal for gas-fired or clean distillate fuel gas turbines that are not expected off-line very often, and allows them to operate more or less continuously if desired.

There may be situations when the particles ingested into the compressor for the sole purpose of compressor cleaning are not adequately "airborne," i.e., they do not have enough velocity to carry them into the compressor where they can contact the metal surfaces. In these situations, an equipment skid setup may be provided consisting of: 1) a hopper that can be pressurized by air, 2) an air compressor or other suitable means of supplying pressurized air, 3) several pressure gauges, 4) one inch piping equipped with valves to "meter in" the expandable coke cleaning composition into the air inlet of the gas turbine after the inlet filter, and 5) attendant controls.

Another mode of employing the expandable coke cleaning compositions is to introduce them directly to the combustion section by injecting them into the combustion air. This requires the fitting out of at least one combustion air pipe to allow the addition of the expandable coke cleaning compositions. Although it may require some reconfiguration of the gas turbine, this is a viable method of introducing the expandable Coke Materials since it is very near the hot gas section where the majority of deposits are found.

For any specific gas turbine unit, it is estimated a single expandable coke charge of 200 lbs. (90 kg.) would be used to effect a single cleaning operation. The specific particle size range of the expandable coke particles are selected based on field trials. This single charge is evenly divided into several (or possibly numerous) equal charges, as determined by the number of combustors, as applicable for the unit to be cleaned. Some units may have two large combustors while others may have 10 to 12 or more combustors, the number being highly dependent on the specific manufacturer and the design version of the unit. Thus, the charge or charges may be held in one or more independent hoppers.

A combustor specific charge is propelled into the specific combustor selected through the water wash nozzles (already in place) by the use of pressurized air (atomizing air or other high pressure supply). The charge should be evenly distributed over a period of approximately 20 to 30 minutes, by use of a ball valve on the exit line of the hopper. This even flow is required to prevent combustor flameout. During this period, note should be taken of the actual power output and turbine exhaust temperature. When no further increase in the power output or decrease in the turbine exhaust temperature is noted, the cleaning sequence is complete.

This procedure, which is then repeated sequentially for all combustors, may remove on average 50% of the ash deposits, resulting in a substantial regaining of the power lost. However, the actual removal will usually be in the 25% to 75% range, but in some instances may be as low as 10%. Higher firing temperature gas turbines will have ash deposits that are harder to remove than units that fire at lower temperatures. A second or third charge per each combustor may be necessary. This complete cleaning sequence can be adjusted based on actual field experience at any installation. It can also be repeated as deemed necessary based on operating modes.

Lastly another mode of employing the expandable coke cleaning compositions is to introduce them directly into the fuel system of the turbine. The recommended minimum treating ratio is three parts of magnesium to one part of vanadium in the fuel. The actual stoichiometric amount of magnesium required to just react with vanadium to make compounds, which are innocuous (no-corrosive) is only about 0.7 to 1. However, additional magnesium is added because not only is the desired magnesium orthovanadate formed, but also less desirable magnesium vanadium compounds and other magnesium products (magnesium oxide and magnesium sulfate). The additional magnesium forces the reaction to form the orthovanadate and offsets some of the other less desirable magnesium and vanadium products. Additionally, since the time allowed for the reaction is very short (due to high gas velocity in the region of the flame), the greater the amount of magnesium added, the greater are the opportunities for a vanadium atom to find (and react with) a magnesium atom.

When using a preferred high concentration, oil soluble magnesium corrosion inhibitor (containing a minimum of 30% magnesium) the formulation would contain about 1% expandable coke used for cleaning. With these formulations, sufficient expandable coke or other material would be available to maintain the gas turbine in a clean condition longer when treating in particular residual or blended furnace fuels.

When treating Light Arabian crude fuels, it may be necessary to include a supplemental treatment of expandable coke and other constituents in the formulations as set forth in the examples above. The reason for this is that these fuels normally contain lesser quantities of vanadium, and consequently require less magnesium corrosion inhibitor additive for treatment. In some instances, not enough expandable coke can be added with normal treatment requirements. Thus a supplemental treatment is needed to provide the desired amount of coke particles to ensure the gas turbine is maintained in a clean state. The power loss of the gas turbine should be monitored as is usually done to determine required dosages.

When introduced into the compressor section, the expandable coke particles impinge on the metal surfaces, cleaning them prior to entering the hot gas section where the process may be repeated.

The advantage of using an expandable coke material instead of more common nutshells or even graphite is the expandable coke will not oxidize in the flame as nutshells or graphite materials may. Thus expandable coke will persist post flame to perform its cleaning function. Because there will not be any oxidation occurring, the momentum (which is equal to the mass times velocity) of the particles will remain unchanged and can be determined from the particle size and/or density of the selected materials used for the cleaning process described herein. A higher specific gravity of the selected particles will enhance the cleaning process.

Typical Coke Materials are produced by Ashbury Carbons by calcining petroleum coke to above 1800° F. to about 2900° F. or higher. These temperatures are safely above the typical hot gas path temperatures of an operating gas turbine. An example of an expanded coke material can be found in WO/2011/007228 published January 2011. The actual manner of production is not critical to this disclosure. Rather the unique concept of using a non-oxidizable expandable coke material to clean the metal surfaces of selected sections of a gas turbine is the main claim of this disclosure.

Because the expandable coke material envisioned in this disclosure is essentially pure carbon with known lubricating properties, it would be lubricative in practice. Carbon is also innocuous in the environment; thus there should be few handling difficulties. Sweeping, followed by a soap and water washing can easily clean up material spills. After the expandable coke passes through the gas turbine performing its cleaning function, any stray particles can be controlled, as would normal particles using technologies that already exist on the turbine.

The simple cleaning processes set forth above associated with each turbine site, permit the expandable coke to be separated from the ash and re-used, thus saving money and the environment since it would not add to the local waste dump.

Unlike the non-expandable coke, the expandable coke of this invention stays in one piece and remains usable for at least 3 to 4 uses. Regarding the purity of the expandable coke of this invention is generally greater than or equal to about 99%. In certain embodiments, the purity is greater than or equal to about 99.5%. In other embodiments, the purity is greater than or equal to about 99.7%. In other embodiments, the purity is greater than or equal to about 99.9%.

The expandable coke of this invention has a greater efficacy compared to non-expandable coke. Generally, an amount of expandable coke to effect a given degree of turbine cleaning is at least $1/10$ an amount of hard condensed coke. In other embodiments, an amount of expandable coke to effect a given degree of turbine cleaning is at least $1/50$ an amount of hard condensed coke. In other embodiments, an amount of expandable coke to effect a given degree of turbine cleaning is at least $1/100$ an amount of hard condensed coke. In other embodiments, an amount of expandable coke to effect a given degree of turbine cleaning is at least $1/150$ an amount of hard condensed coke. In other embodiments, an amount of expandable coke to effect a given degree of turbine cleaning is at least $1/200$ an amount of hard condensed coke. This improved efficacy results in improved cost effectiveness and improved environmental acceptability. The improved efficacy also results in reduced storage capacity and smaller hoppers sizing.

The expandable coke of this invention has a greater crush strength/density. The expandable coke of this invention compared to the solid dense coke of U.S. Pat. No. 4,065,322 is like comparing a kernel of popcorn before microwaving it to form the soft large form it takes after being popped. The expandable coke of this invention is the same, when it heats inside the turbine it expands and becomes much softer and hits the blade and smashes down onto the blade and sliding along the turbine blade surface thereby cleaning a wide path of the ash off the blade. Additionally, the expandable coke mixes into the ash and very little makes it into the atmosphere compared to the hard dense coke of U.S. Pat. No. 4,065,322. In contrast, the hard dense coke of U.S. Pat. No. 4,065,322 hits the blade and breaks up into small pieces, becoming an environmental airborne concern and losing its efficacy as well. Small pieces don't clean effectively due to lack of mass velocity.

The expandable coke of this invention mixes with the ash and, therefore, less of the expandable coke becomes air borne compared to the small particles of dense coke produced using the dense coke of U.S. Pat. No. 4,065,322, which shatters into many little pieces that are not effective at cleaning turbine blades and they go up into the atmosphere.

The expandable coke of this invention permits considerable cost saving by reducing the quantities required for effective cleaning and thereby reducing storage and equipment size requirements as compared to the dense coke of U.S. Pat. No. 4,065,322.

The expandable coke of this invention has improved lubricating values. Because the expandable coke of this invention slides along the surface of the turbine after contacting the surface and collapsing, it leaves a residual film that provides blade protection and provides lubricant value to the blade. The improved lubricating value of the blade means reduced the amount of ash that sticks to the blade as the turbine is running. The film also protects the blade surface from corrosion and heat damage.

U.S. Pat. No. 4,065,322 disclose that "another feature of these types of carbon materials which prescribes their use is their fracture characteristics. Upon impact with the vanes and blades of the compressor some of the kinetic energy held by the carbon particles is dissipated through fracture of the particle." U.S. Pat. No. 4,065,322 considered this to be a positive characteristic, by further explaining: "[s]ince the abrasive characteristics of the particle are retained in each piece, removal of contamination from downstream vanes and blades is enhanced." However, since momentum is directly proportional to mass times velocity, as the particles fracture, they will—by necessity—become smaller, less mass. Since the geometry of a gas turbine hot gas path is such that the volume increases as a particle moves away from the combustor, gas stream velocity and hence particle velocity will become less and less as each successive stage is entered. Thus, the U.S. Pat. No. 4,065,322 concept of fracturing particles will quickly become a disadvantage after the first particle impact fractures the described particles.

Conversely in the present patent (ours) we propose a particle that will subtend the same volume and mass as it continues to move through the gas turbine hot gas path. In actuality, the expandable nature of the particles will lead to larger (volume) particles to impact even more surface area.

As a new benefit of our method, the particles of expandable coke will have a more or less constant density—beginning with a more or less constant particle size and expanding to a more or less constant size—it will be much easier to separate the introduced coke particles from normal ash generated by combusting fuel in gas turbine operations. Using equipment such as a hydrocyclone, it should be quite possible to position a takeoff stream such that the heavier normal ash particles will exit the hydrocyclone at one (or more levels) while the more or less constant expanded coke particles can be removed from still another level. This will facilitate either reuse or recycling of the expanded coke particles into other valuable products by a subsequent process.

Utilizing still another process it should be possible to return the coke to its unexpanded state and thereby reuse the expandable coke on site to further reduce both material costs and any undesired environmental impact.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A particulate cleaning composition for on-line cleaning of surfaces hydrocarbon fuel burning gas turbine system a comprising:
   a high purity expandable coke or a mixture of high purity expandable cokes,
   a high purity non-expandable coke or a mixture of high purity non-expandable cokes, or
   mixtures of high purity expandable cokes and high purity non-expandable cokes,
where:
   the coke particles have sizes ranging between about 0.01 microns (μm) and about 1,000 microns (μm),
   the high purity cokes are greater than 99% carbon,
   the expandable coke particles are capable of expanding up to about 150 times their initial volume when heated above a predetermined temperature, and
   the composition is capable of cleaning selected sections of a hydrocarbon fuel burning gas turbine system without significant loss of in system power production.

2. The composition of claim 1, wherein the high purity cokes are greater than 99.5% carbon.

3. The composition of claim 1, wherein the high purity cokes are greater than 99.75% carbon.

4. The composition of claim 1, wherein the high purity cokes are greater than 99.9% carbon.

5. The composition of claim 1, wherein the selected sections are associated with a compressor.

6. The composition of claim 1, wherein the selected sections are associated with a hot gas path.

7. The composition of claim 1, wherein the selected sections are associated with heat recovery equipment.

8. The composition of claim 1, wherein the system burns wherein the system burns a fuel selected from the group consisting of heavy fuel oil, Light Arabian crude oil, light distillate fuel oil, natural gas fuel and mixtures or combinations thereof.

* * * * *